W. E. TRAPHAGEN.
VEHICLE BRAKE.
APPLICATION FILED AUG. 11, 1919.

1,362,372. Patented Dec. 14, 1920.

INVENTOR
William E. Traphagen
BY John A. Bornhardt
ATTY

UNITED STATES PATENT OFFICE.

WILLIAM E. TRAPHAGEN, OF CLEVELAND, OHIO, ASSIGNOR OF ONE-HALF TO PEDRO LUIS, OF CLEVELAND, OHIO.

VEHICLE-BRAKE.

1,362,372. Specification of Letters Patent. Patented Dec. 14, 1920.

Application filed August 11, 1919. Serial No. 316,543.

*To all whom it may concern:*

Be it known that I, WILLIAM E. TRAPHAGEN, citizen of the United States, residing at Cleveland, in the county of Cuyahoga and State of Ohio, have invented certain new and useful Improvements in Vehicle-Brakes, of which the following is a specification.

This invention relates to brakes of the internal expansion band type, and has for its object to provide an improved brake adapted to be actuated by fluid pressure, the device being particularly serviceable in connection with air brakes which may be applied to motor vehicles, although capable of use in connection with vehicles of other kinds.

In one form of the device means are provided for automatically controlling the amount of air admitted to operate the brakes for service application. Means are also provided for permitting an emergency or heavy application of the brakes when desired.

Figure 1:
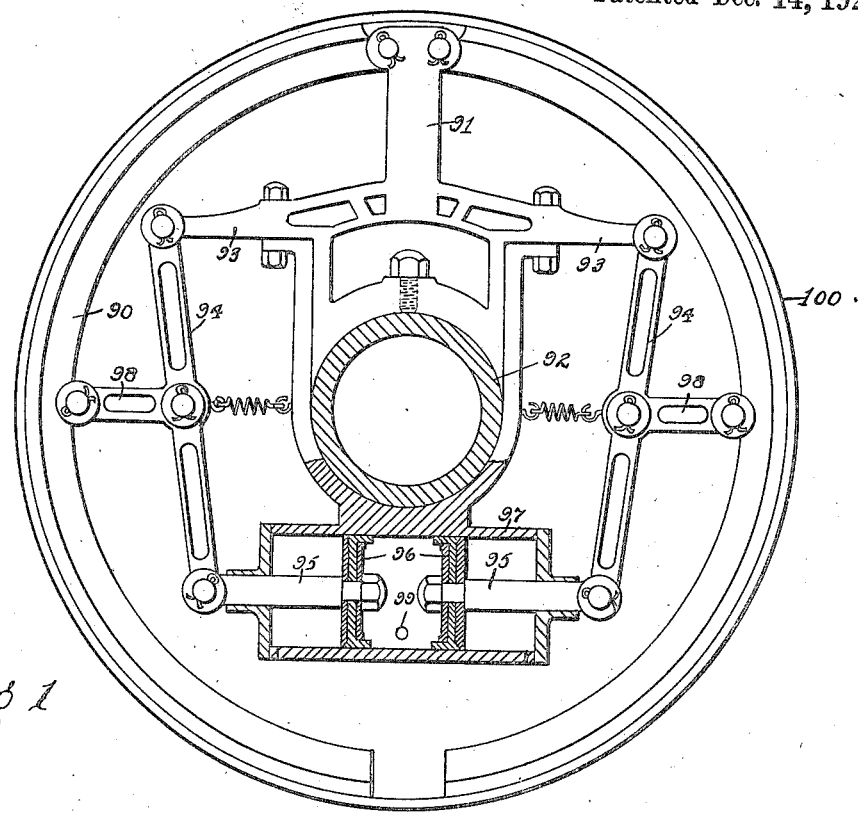
Figure 2:
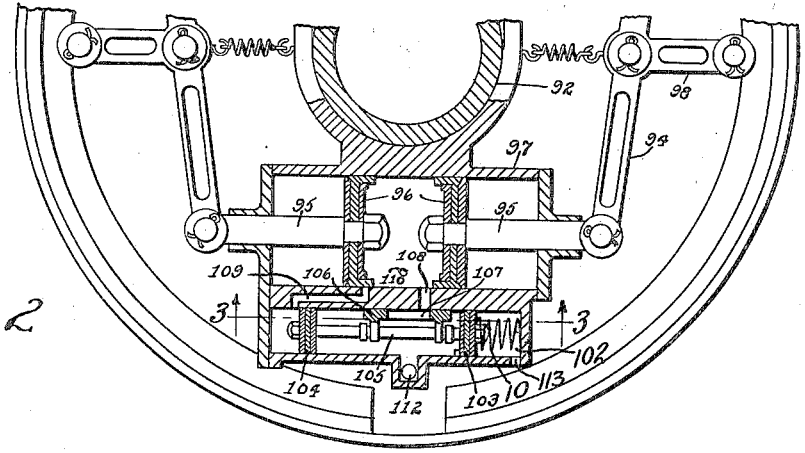
Figure 3:
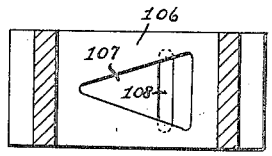

In the accompanying drawings Figure 1 is a sectional elevation of a simple form of the mechanism. Fig. 2 is a similar view of a modification provided with the automatic control valve. Fig. 3 is a detail of a valve.

The brakes are of the internal expanding type and the actuating means are what I shall term self-contained, that is, the means are entirely inclosed within the brake drum and are thereby prevented from accumulating dust and dirt which is likely to impair their efficiency. The brakes and their actuating means comprise the brake band sections 90 which are made in the customary manner and are pivotally supported at one of their ends upon a bracket 91 secured to the rear axle housing 92 in the manner shown. The bracket 91 is provided with transverse extensions 93 which support depending links 94, said links having connection at their lower ends to the piston rods 95 of a pair of pistons 96 mounted within a cylinder 97, said cylinder being supported by the bracket 91 and intermediate of their ends the links 94 have pivotal connection with the brake bands 90 through a pair of short links 98.

Air from any suitable supply, controlled by a driver's valve (not shown) is admitted to the central portion of the cylinder through a port 99 provided therein, and upon pressure being admitted to the cylinder it will build up between the pistons 96 forcing the same outwardly and through the toggle arrangement of links will force the brake bands against the interior of the brake drum 100.

Referring particularly to Fig. 2 I have shown a modified form of brake actuating mechanism, certain parts of which are identical in construction with the previously described form and consequently bear like reference numerals. The modified form has embodied in connection with the cylinder 97 an automatic valve for the application of the brake and consequently with this form it is unnecessary to use an automatic valve in connection with driver's control valve. This automatic valve comprises a cylindrical extension on the bottom of the cylinder 97 and which is provided with a bore 102 in which are placed plungers 103 and 104 connected to each other by means of a rod 105. Intermediate of the plungers the rod supports a slide valve 106 provided with a triangular opening 107 which at predetermined times communicates with the interior of the cylinder 97 through a rectangular port 108. Communication is also had at stated intervals from the cylinder 97 to the interior of the cylinder 102 through a passage 109 which communicates with the end of the bore 102 in which is placed the plunger 104. Cylinder 97 is also provided with an inlet port 110 and the bore 102 is provided with an inlet port 112, from any suitable source of supply.

In operation for service application, air is admitted to the interior of the cylinder 97 through the port 112 and passes into the central part of the cylinder 97 through the opening formed by the triangular port 107 and rectangular port 108. This continues until the pressure between the plungers 96 is sufficient to cause them to move outwardly or toward the ends of the cylinder, and as they do so one of them uncovers the passageway 109 and allows the pressure to build up between the cylinder head and plunger 104. As this pressure is increased it forces the plunger 104 with its connected parts in a direction to reduce the size of the opening formed by the ports 107 and 108, thus decreasing the amount of air allowed to enter between the plunger 96 until such time as said opening is entirely closed. The exhaust is taken care of by a reverse action through the driver's control valve hereinbefore referred to, and the valve is then returned by a spring 10 between the piston 103 and the adjacent end of the cylinder. The plunger 103 is allowed to operate within the bore 102 without creating any vacuum by means of the vent 113 provided therefor. For an emergency application, air is admitted between the plungers 96 immediately through the port 110 and the action obtained thereby is the same as described for the simple type of actuating means. It will be seen that air being admitted in this manner will have no effect on the plungers 104 and its corresponding parts other than to close the opening formed by the ports 107 and 108, which is necessary in order to build up quickly sufficient pressure between the plungers 96 to cause them to act quickly and positively.

I claim:

1. In a brake, the combination with a brake band and drum, of a cylinder, a pair of pistons in said cylinder connected respectively to opposite sides of the brake band, and means to control the admission of pressure between the pistons, said means including an automatic valve provided with means to progressively reduce the flow of pressure to said cylinder as the pressure increases therein.

2. The combination with a brake and an operating cylinder and piston, of means to control the admission of pressure to said cylinder, comprising an automatic valve operated by pressure in said cylinder, and through which valve the inlet pressure is supplied, said valve having a tapered port adapted to gradually reduce the amount of pressure admitted to the cylinder as the pressure increases therein.

3. In a brake, the combination with a brake drum and internal band, of an axle housing, a bracket supported thereby and having opposite arms, the band being attached to the bracket, a cylinder supported by the bracket, opposite pistons in the cylinder, and operative connections between the pistons and the opposite sides of the band, including levers fulcrumed on the bracket.

4. In a brake, the combination with a brake band and drum, of a cylinder, a pair of pistons in said cylinder connected respectively to opposite sides of the brake band, and means to control the admission of pressure between the pistons, said means including an automatic valve provided with means to progressively reduce the flow of pressure to said cylinder as the pressure increases therein, said cylinder being also provided with means to admit pressure between the pistons directly instead of through the automatic valve.

5. In a brake, the combination of a brake member, a cylinder, a piston therein operatively connected to the brake member, said cylinder having two pressure inlet ports, and an automatic pressure reducing valve controlling one of said ports and actuated by pressure in the cylinder.

6. In a brake, the combination of a brake member, a cylinder, a piston therein operatively connected to the brake member, said cylinder having two pressure inlet ports, and an automatic pressure reducing valve controlling one of said ports and actuated by pressure in the cylinder, said valve including a small piston and a slide connected thereto and having a tapered port coöperating with the last mentioned port.

In testimony whereof I do affix my signature in presence of two witnesses.

WILLIAM E. TRAPHAGEN.

Witnesses:
JOHN A. BOMMHARDT,
HELEN O'CONNOR.